United States Patent [19]

Slaughter et al.

[11] Patent Number: 5,641,106
[45] Date of Patent: Jun. 24, 1997

[54] REMOVABLE ARCHERY BOW STORAGE RACK FOR VEHICLES

[76] Inventors: Bradford R. Slaughter, 4455 S. 375 East, Ogden, Utah 84405; Roy P. Ziegenhirt, Jr., 1147 Rushton, Ogden, Utah 84401

[21] Appl. No.: 425,551

[22] Filed: Apr. 20, 1995

[51] Int. Cl.$^6$ ............................................... B60R 9/00
[52] U.S. Cl. ..................... 224/324; 224/329; 224/916
[58] Field of Search ............................ 224/324, 916, 224/488, 537, 309, 329, 546, 559

[56] References Cited

U.S. PATENT DOCUMENTS

| D. 314,303 | 2/1991 | Glaspie | D6/552 |
|---|---|---|---|
| 3,295,732 | 1/1967 | Haven | 224/916 |
| 3,606,111 | 9/1971 | Gjesdahl | 224/324 |
| 4,253,594 | 3/1981 | Parks | 224/329 X |
| 4,957,229 | 9/1990 | Freeman | 224/916 |
| 5,249,722 | 10/1993 | Horn | 224/916 |
| 5,360,190 | 11/1994 | Walker et al. | 224/309 X |
| 5,505,357 | 4/1996 | Chimenti et al. | 224/324 |

OTHER PUBLICATIONS

Article —"Freedom Holder Vehicle Rack System With Suction Mounts Afford Instant Installation", p. 57, Spring Annual 1995, Bow Masters Magazine, Thicket Publishing, Inc.

*Primary Examiner*—Renee S. Luebke
*Attorney, Agent, or Firm*—Foster & Foster

[57] ABSTRACT

A removable archery bow storage rack for vehicles includes a first frame half and a second frame half. A pair of tensioning adjustment straps secure the first frame half to the second frame half. Opposed hood anchor assemblies, in combination with the tensioning adjustment straps, secure the first and second frame halves to the hood of a vehicle without any modification or alteration of the vehicle. A plurality of leg rest assemblies are disposed between each of the frame halves and the top surface of the hood. The leg rest assemblies include a damping device to dampen vibrations and absorb shock imparted to the first and second frame halves during transit. Pairs of limb rest assemblies and string support assemblies on each frame half allow an archery bow to be secured to each of the frame halves in part by the draw weight of the particular bow.

29 Claims, 5 Drawing Sheets

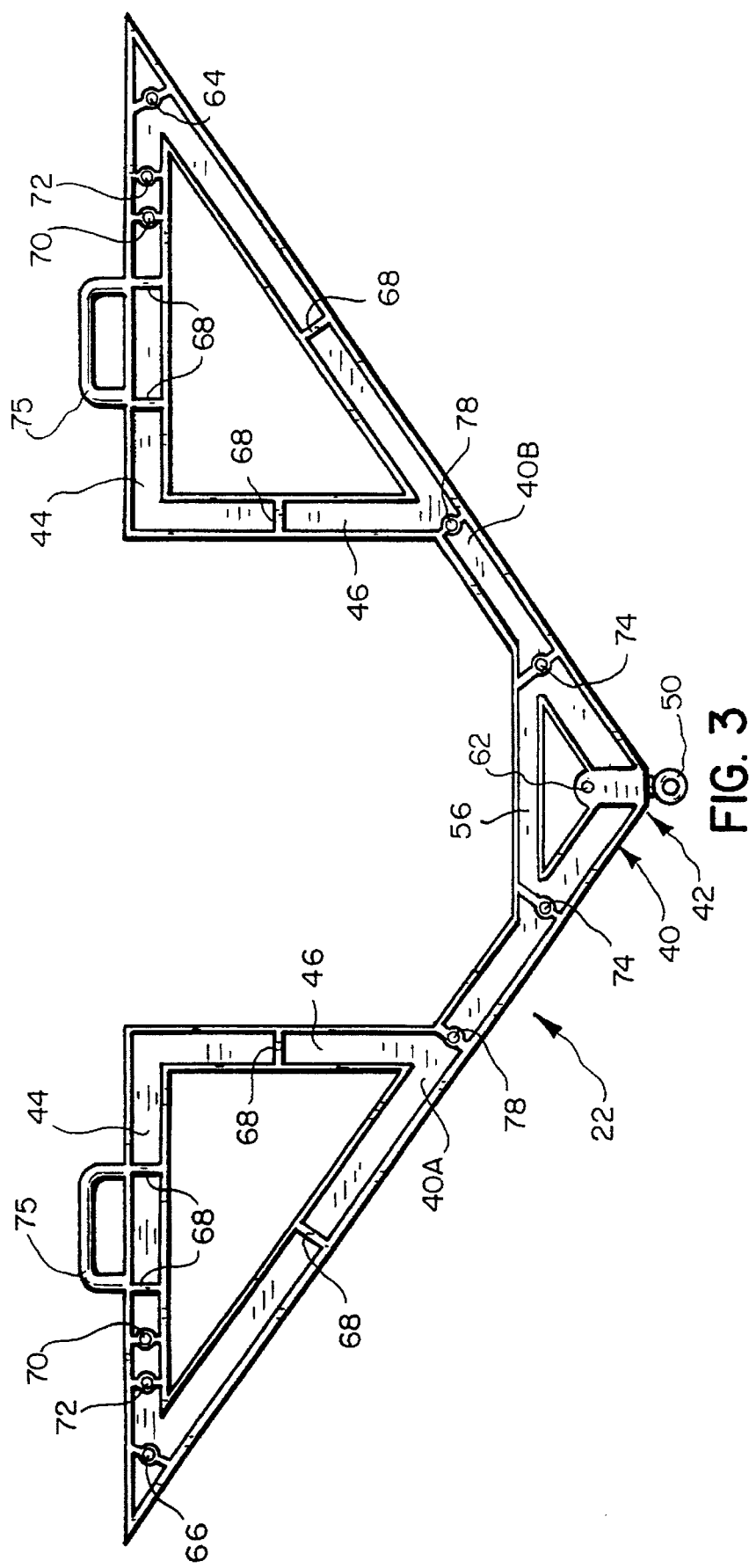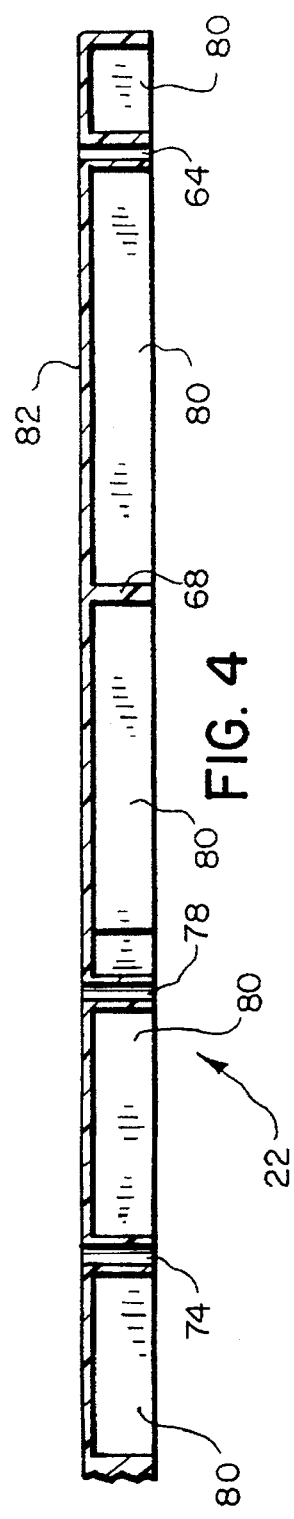

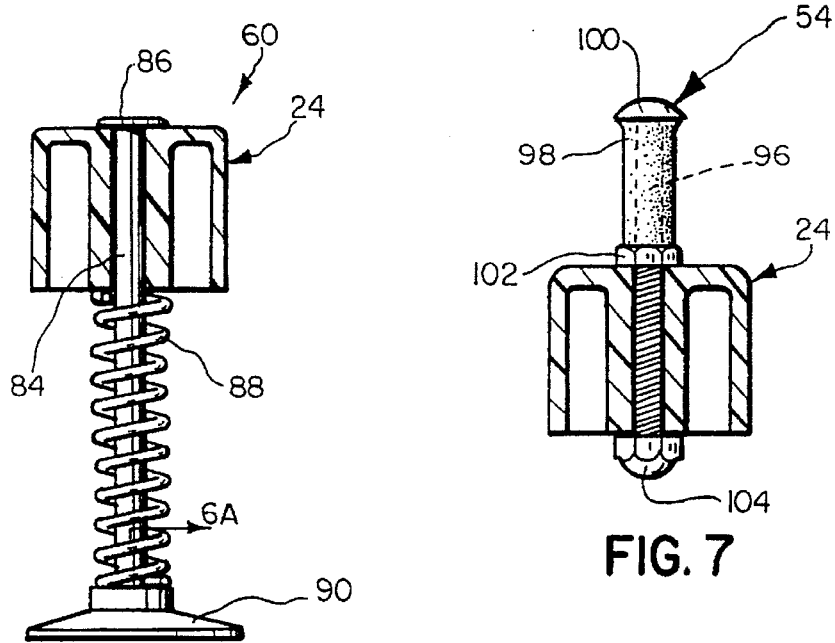
FIG. 6
FIG. 7
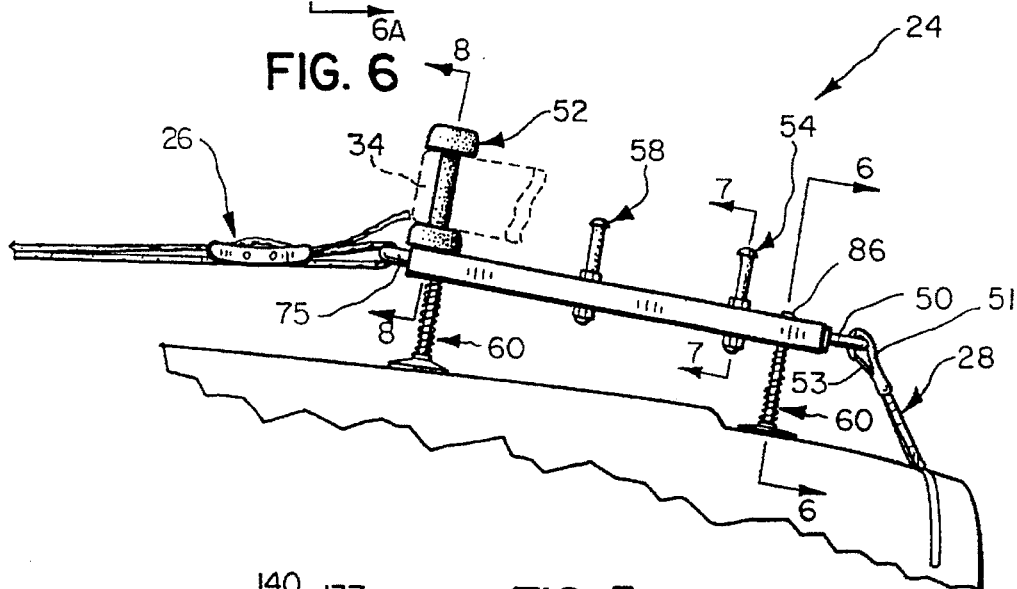
FIG. 5
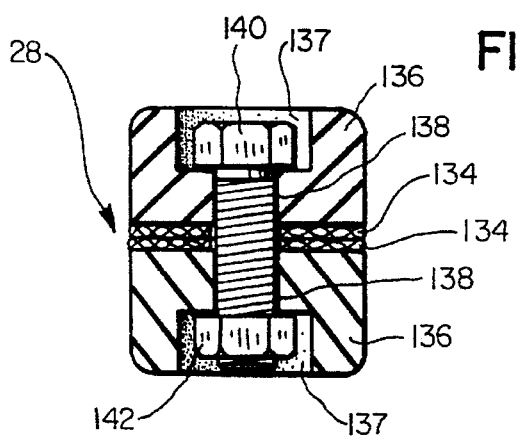
FIG. 11
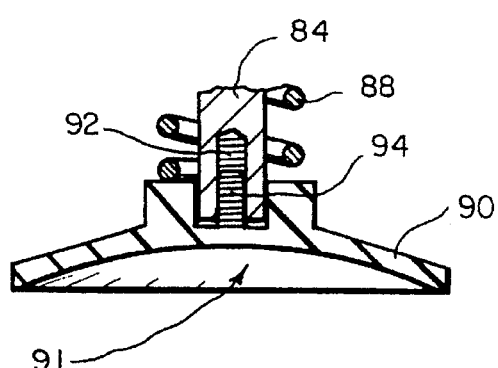
FIG. 6A

REMOVABLE ARCHERY BOW STORAGE RACK FOR VEHICLES

TECHNICAL FIELD

This invention relates to archery bow storage racks, and more particularly, to portable, removable archery bow storage racks for vehicles.

BACKGROUND OF THE INVENTION

Various methods have been used over the years to transport archery bows to and from locations for shooting archery bows. Archery bow cases have long been used for transporting archery bows. Both hard shell and soft cases are well known. Archery bow cases provide protection wherever the archery bow is being transported.

One major problem with respect to hauling archery bows is that they consume a large amount of interior compartment space when the archery bow is transported inside a vehicle. A bow case holding an archery bow creates a large amount of bulk, particularly hard cases, which consume valuable payload space. Since hunting and camping often go hand in hand, extra payload space is always desirable. If a bow is transported inside a vehicle without using a bow case, the archery bow almost invariably must be placed on top of all other equipment inside the vehicle to avoid damage. Even still, if the equipment shifts during transit, damage to the archery bow can result.

Some efforts have been made to provide archery bow storage devices mounted inside the bed of a typical pickup truck. For example, U.S. Pat. No. 4,957,229 discloses a vehicle mounted archery bow holder for mounting to an inside wall of a pickup truck bed. U.S. Pat. No. 5,249,722 discloses another type of archery bow holder which is also mounted to an inside wall of a pickup truck bed. Such holders require permanent alteration of the vehicle itself, and typically require permanent or at least semi-permanent mounting. Such storage racks impede other potential uses of a pickup truck bed, and may expose the archery bow to damage from other objects inside the truck bed.

Another problem with respect to the transportation of archery bows relates to the need to quickly access the archery bow during hunting. One common method of hunting game animals with an archery bow involves driving back country roads in search of game animals. If such an animal is spotted, the hunter must be able to access quickly the archery bow while exiting the vehicle quickly. One commonly used method to prepare for a road hunting encounter with a game animal is to hold the archery bow between a passenger's legs or on the passenger's lap while the vehicle moves down the road. The approach presents a major problem, however, in that both the vehicle and the archery bow itself are easily damaged. Typically, once a game animal is encountered while driving down a road, little attention is paid to the precise manner in which a bow is removed from a vehicle. Banging and clanking of the archery bow against portions of the vehicle will inevitably result. The alarm a game animal experiences upon seeing a vehicle will be further compounded by such noise. Furthermore, the between-the-legs approach cannot, for obvious reasons, be used by the vehicle operator.

In view of the foregoing problems, there is a need to develop an archery bow rack that can be used in connection with a vehicle to mount the archery bow to an exterior portion of a vehicle so that precious storage space within the vehicle as well as hauling space inside a truck bed can be preserved. There is an additional need to provide an archery bow storage rack that allows either the driver of the vehicle or a passenger to quickly and immediately access a bow for pursuing a game animal observed when driving down a back country road. There is also a need to provide an archery bow storage rack that holds the archery bow without damaging the vehicle or the archery bow, and that requires no permanent mounting to the archery bow.

SUMMARY AND OBJECTS OF THE INVENTION

The present invention relates to an archery bow storage rack device that is portable and removably attachable from a vehicle. The archery bow storage rack according to the present invention is secured to a hood portion of a vehicle without the need of modifying or altering the vehicle structure in any way. A pair of frame members are secured together by a pair of tensioning adjustment straps. A pair of hood anchor assemblies are attached to the respective frame members to hold, in combination with the tensioning adjustment straps, the archery bow storage rack in position on top of the vehicle. A plurality of leg supports, each of which include a shock-absorbing coil spring and suction cups for contacting the top of the hood, are attached to each of the frame members. Pairs of limb rests and string supports are coupled to each frame member to allow the archery bow to be held in place on the storage rack in substantial part by a portion of the draw weight of the archery bow. The archery bow storage rack is designed to be utilized in connection with the hood of almost any vehicle.

In view of the foregoing, it is a primary object of the present invention to provide an archery bow rack for a vehicle that is completely portable and removable from the vehicle.

Another object of the invention is to provide an archery bow rack that is mounted on top of a vehicle hood without damaging or in any way altering the structural characteristics of the vehicle hood or any other part of the vehicle.

Still another object of the invention is to provide an archery bow storage rack that holds an archery bow in a storage position for immediate and easy access so that game animals can be pursued quickly after be observed while driving down back country roads.

Still another object of the invention is to provide an archery bow storage rack that allows an archery bow to be stored outside of the vehicle to provide extra storage space inside the vehicle.

Another object of the invention is to provide an archery bow storage rack that allows an archery bow to be stored without the need to remove archery accessories mounted to the archery bow.

Yet another object of the invention is to provide an archery bow storage rack that allows for the storage of two archery bows.

Another object of the invention is to provide an archery bow storage rack that is adjustable and mountable on top of the hood of most any vehicle.

Another object of the invention is to provide an archery bow storage rack that stores an archery bow in a substantially horizontal position.

Another object of the invention is to provide an archery bow storage rack that includes a damping device to dampen vibrations and absorb shock imparted to the storage rack.

Other objects, features, and advantages of the invention will become apparent from the following detailed description of the invention with reference to the drawings.

BRIEF DESCRIPTION OF THE DRAWINGS

Preferred embodiments of the invention are described below with reference to the accompanying drawings:

FIG. 3 is a bottom view of the archery bow storage rack of FIG. 2;

FIG. 4 is a section view, taken along the line 4—4 of FIG. 2;

FIG. 5 is a side elevation view of one half of the archery bow storage rack according to the present invention mounted on top of a hood of a vehicle;

FIG. 6 is a partial sectional side elevation view, taken along the line 6—6 of FIG. 5, showing a leg assembly of the present invention;

FIG. 6A is a sectional side elevation view, taken along line 6A—6A of FIG. 6, of a suction cup platform assembly of the present invention;

FIG. 7 is a partial sectional side elevation view, taken along the line 7—7 of FIG. 6, of a string support assembly according to the present invention;

FIG. 11 is a partial sectional side elevation view, taken along the line 11—11 of FIG. 10, showing a hood anchor assembly of the present invention.

DETAILED DESCRIPTION OF THE INVENTION

Figure 1:
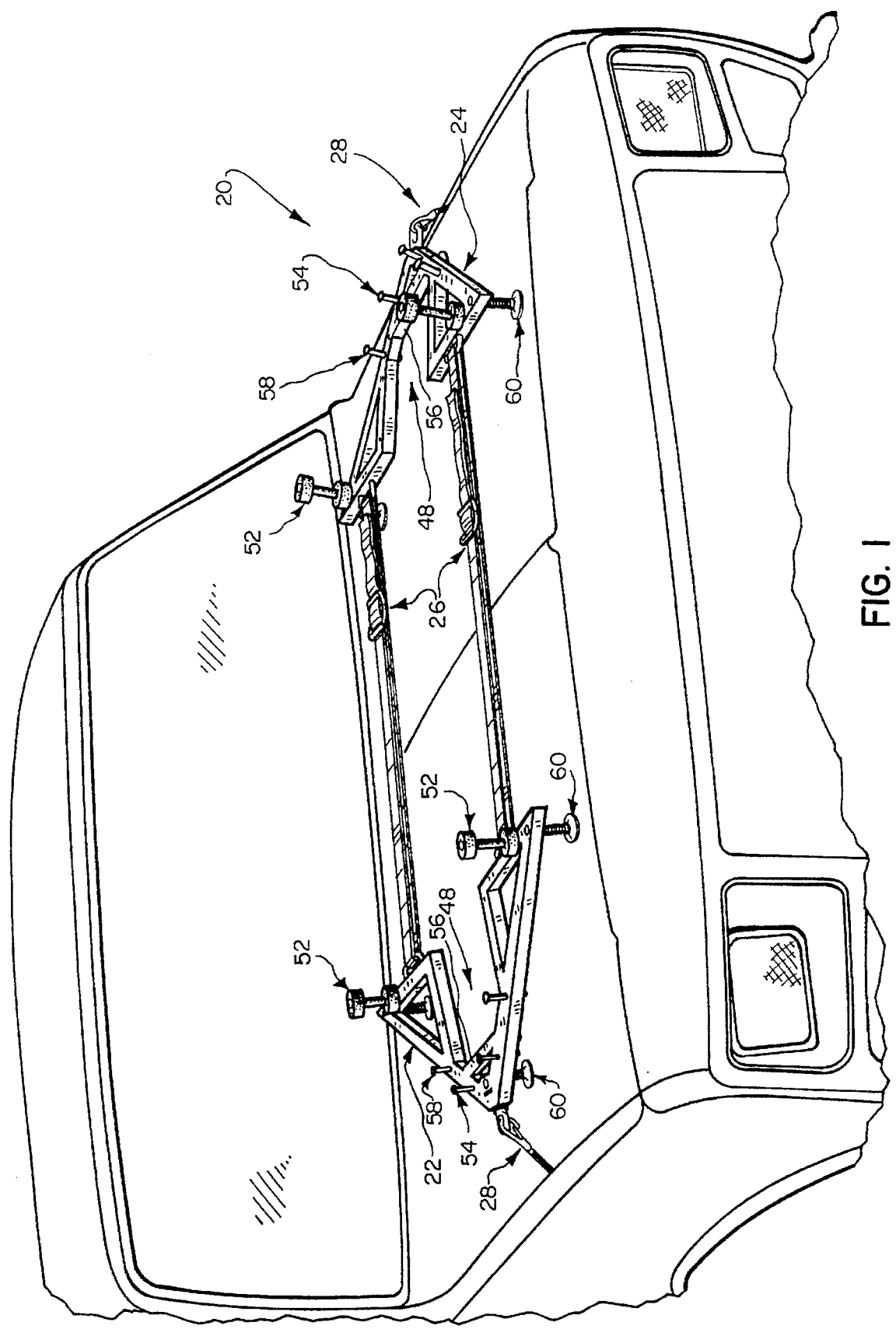
FIG. 1 is an isometric view of an archery bow storage rack mounted to the hood of a vehicle according to the present invention.

FIG. 1 shows an archery bow support rack 20 comprising generally two frame assemblies. The first frame assembly includes a first frame member or first frame half 22. The second frame assembly includes a second frame member or second frame half 24. The first frame half 22 and the second frame half 24 are secured together by a pair of tensioning adjustment strap assemblies 26. A pair of hood anchor strap assemblies 28 are connected to the respective frame halves 22, 24 to secure the archery bow support rack to a hood portion of a vehicle. It is to be understood that although the invention as shown in FIG. 1 shows two frame halves 22 and 24, a single frame half 22 or 24 could be used by lengthening the tensioning adjustment strap assemblies 26 and connecting such assemblies directly to one or more hood anchor assemblies 28 without departing from the scope of the present invention.

Figure 2:
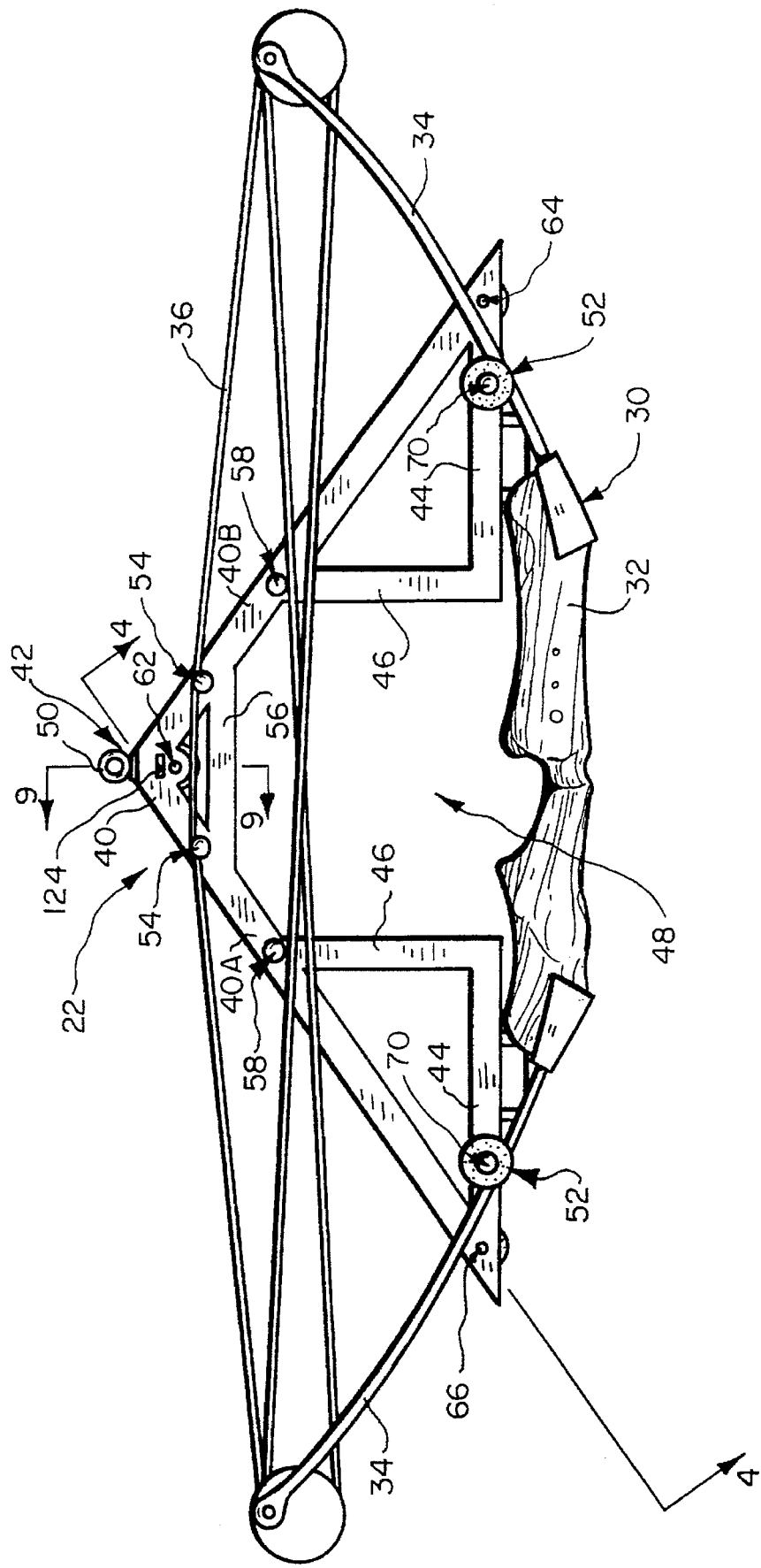
FIG. 2 is a top plan view of the archery bow storage rack with an archery bow mounted thereon.

FIG. 2 shows the first frame half 22, corresponding to the passenger side of the vehicle, with an archery bow 30 mounted thereon. The archery bow comprises a conventional handle riser portion 32, a pair of opposed limbs 34, and a bow string 36 extending in tension between the opposed bow limbs 34. The archery bow shown in FIG. 2 is merely representative of a conventional archery bow. Although the present invention is suitable for use with all types of compound archery bows, it may also be used with other types of bows, such as traditional recurve and long bows.

The first frame half 22 and the second frame half 24 are substantially identical to one another. The frame half 22 shown in FIG. 2 comprises a main frame structure 40 which forms an apex location 42. The main frame structure 40 comprises a first side 40A and a second side 40B, which are mirror images of one another. The two sides are joined at the apex location 42. A cross brace 56 extends between the first side 40A and the second side 40B at the top end of the triangularly shaped frame adjacent the apex location 42. The cross brace 56 provides stability and strength to the frame structure. The frame half 22 further comprises inwardly extending subframe members 44 which extend inwardly from the respective ends of main frame members 40A, 40B. Cross frame members 46 interconnect the subframe members 44 with the main frame structure 40 to render the entire frame half 22 as an integral structural frame piece. The cross frame members further provide vertical support for holding the weight of an archery bow as well as support in a horizontal direction such that upon tensioning of strap assemblies 26, the frame halves 22 and 24 have sufficient structural mass to withstand foreseeable stresses placed on the frame halves.

The frame configuration of the present invention is highly unique, rendering the frame assembly strong, yet lightweight. The frame is generally truss shaped or triangular shaped and includes holding locations for suspending an archery bow at the corner regions of the frame assembly. Specifically, the string support or string rest assemblies 54 and 58 are located generally at the top, apex end of the triangularly shaped frame configuration. Limb rest assemblies 52 are mounted to opposed base corners of the base side of the triangularly shaped frame configuration. The string mounting locations and the limb rests provide a triangularly shaped mounting configuration for the archery bow limbs and the strings for suspending the archery bow on the storage rack. A central access space 48 is created at the interior area of the frame half 22 so that archery accessories attached to the archery bow, such as (without limitation) a stabilizer, a cable guard, a quiver, arrows, a sight assembly, and the like, can be accommodated by the frame assembly while the archery bow is mounted on the archery bow support rack.

Overall, the frame configuration comprises a highly unique design that allows the storage rack assembly to be economically and efficiently manufactured. The frame assembly also provides a storage rack structure that can adequately and advantageously hold an archery bow in part by the draw weight of the archery bow independent of any structure of the vehicle. Therefore, an archery bow could be first suspended on the frame assembly and subsequently the frame assembly could be positioned or mounted on the vehicle. It is to be understood that the archery bow can be held by the support rack 20 on either side, so that, if desired, the quiver and arrows can be positioned facing upwardly. It is also to be understood that although the embodiment shown in the drawings shows the frame configuration mounted to a hood of a vehicle in a horizontal position, it is to be understood that the unique and efficiently designed frame configuration could be mounted to a generally vertical portion of a vehicle to store an archery bow in a generally vertical position without departing from the scope of the present invention.

Referring still to FIG. 2, mounted to the apex location 42 is a eye bolt 50 fixedly mounted to the apex location. The eye bolt 50 provides a location for attaching the hood anchor strap assembles 28 (FIG. 1). Details of the eye bolt 50 are described below.

A pair of limb rest assemblies 52 are mounted to the subframe members 44. The limb rest assemblies provide a cushioned, positive interlocking area for the respective bow limbs 34 to rest. Because of the construction of the limb rest assemblies 52, virtually any type of archery bow, particularly compound archery bows, can be used in connection with the present invention.

Multiple pairs of string supports in the form of string rest assemblies 54, 58 are mounted to the main frame sides 40A and 40B, respectively. The pairs of string rest assemblies provide alternative holding or support locations for the bow string 36. The particular pair of bow string rest assemblies, 54 or 58, that are to be used depends upon the characteristics of the archery bow and the desired tension for holding the archery bow while the vehicle is in transit. Although only two pairs of string supports are shown in the preferred embodiment, it is to be understood that more or less pairs could be incorporated into the storage rack assembly without departing from the scope of the present invention. The string rest assemblies enable the string draw weight tension to provide a substantial portion of the holding power by which the archery bow is held in place on the archery bow storage rack in a horizontal, easy-to-access position.

Referring now to FIGS. 1 2, and 5, multiple shock absorbing leg assemblies 60 are secured at the three corners of the generally triangularly shaped frame halves 22, 24. With reference to FIG. 2, the shock absorbing leg assemblies are mounted to the frame at locations 62, 64, and 66, respectively. The shock absorbing leg assemblies 60 serve as damping devices to provide a biasing support to the respective frame halves 22, 24 to provide a more stable ride for the archery bow. The leg assemblies dampen vibrations imparted to both the frame assembly and the archery bow suspended thereon. Additional details of the shock absorbing leg assemblies are described in greater detail below.

FIG. 3 shows the underside of the frame half 22 (with the main frame portions 40A, 40B reversed as compared to FIG. 2). The frame half 22 is preferably injection molded glass filled nylon. The characteristics of such material are highly suitable for the present invention, given its lightweight nature and its structural characteristics. It is to be understood, however, that other suitable materials, such as aluminum or steel, could be used pursuant to the present invention.

The frame half 22 is preferably entirely integral. The main frame structure 40, the subframe members 44, and the cross frame members 46 all have generally U-shaped cross sections. A plurality of strengthening ribs 68 are provided at various locations on the frame half 22 to provide enhanced strength and stability to the frame. As shown in FIG. 4, the strengthening rib 68 is solid and bridges the entire gap between the U-shaped frame. It is to be understood that the strengthening ribs shown in FIG. 3 are merely representative in terms of number and locations, and that more or less strengthening ribs could be utilized, if necessary. Strengthening ribs are provided on each side of mounting locations 64 and 66, to provide sufficient structure so that the shock absorbing leg assemblies 60 are mounted through adequate structure to prevent failure in the material.

Pairs of mounting locations 70, 72 are provided for alternative mounting locations for the pairs of limb rest assemblies 52 (FIG. 3). The specific mounting location 70 or 72 will depend upon the characteristics of the archery bow to be stored by the present invention. Strengthening rib portions are provided on each side of the mounting locations 70, 72 to provide adequate structural material to support the limb assemblies. Pairs of mounting locations 74 and 78 are included in the main frame sides 40A, 40B, to provide locations for mounting the bow string rest assemblies 54 and 58. The mounting locations 74 and 78 include strengthening rib portions extending on each side of reinforced annular passageway portions.

FIG. 4 shows a cross-section of the frame portion, similar to the other cross-sections of frame portions shown in FIG. 3. Opposed side walls 80 (only one shown) and a bottom wall 82 form a generally U-shaped frame assembly.

FIG. 5 illustrates access spaces provided both above and below the frame half 24. The above and below spaces correspond to the central access space 48 shown in FIGS. 1 and 2. The access space 48 allows the storage rack to hold an archery bow without the need to remove archery accessories attached to the archery bow. FIG. 5 also shows the positioning of an archery bow limb 34 (shown in phantom) as it is held by a limb rest assembly 52. Positive locking results when the limb engages the upper bumper 112 and lower bumper 118 (FIG. 8) on the limb rest assembly. This prevents vertical displacement of the archery bow relative to the frame assembly 24 during transit. It is to be understood that the axial thickness of the bumpers as well as the spacing between the bumpers can be varied to accommodate virtually any size or type of archery bow.

FIGS. 6 and 6A disclose additional details of the shock absorbing leg assembly 60 which comprise generally an upstanding support structure in the form of a bolt 84, specifically a female screw, that is inserted through a passageway formed in the frame half 24. The bolt 84 includes at one end a head portion 86 which prevents additional downward movement of the bolt through the passageway of frame 24. A coil spring 88 is inserted over the major portion of the bolt 84 and bears against a platform in the form of a rubber foot 90 attached to the opposite end of bolt 84. The rubber foot 90 (details shown in FIG. 6A) is preferably a suction cup having a resilient, arcuate cupped portion 91 so that hood-top mounting can be accomplished without damage to the hood. Application of the suction cup to the hood creates a vacuum that prevents relative displacement between the archery bow support rack and the vehicle hood. Provided the hood surface is clean and free of foreign objects and particles, no damage results from use of the suction cups. The rubber foot 90 includes a threaded male portion 94 which is threaded into a corresponding female threaded portion 92 of the bolt 84. The coil spring 88 provides damping and shock absorbing to the archery bow support rack 20 to prevent the archery bow from being damaged during transit.

FIG. 7 shows the details of a string rest assembly 54. It should be noted that string rest assembly 58 is substantially identical. The string rest assembly 54 is formed by providing an elongated carriage bolt 96 which is inserted through a particular tapped mounting location in the frame half 24. A section of rubber 98, such as a section of rubber hose, is inserted over the carriage bolt 96 and abuts the carriage bolt head 100. A hex nut 102 is threadedly inserted over the carriage bolt 96 to secure the rubber portion 98 in place. The remainder of the carriage bolt is then threadably inserted through the particular tapped mounting location in the frame half 24. A crown nut 104 prevents the carriage bolt from loosening relative to the frame half 24.

Figure 8:
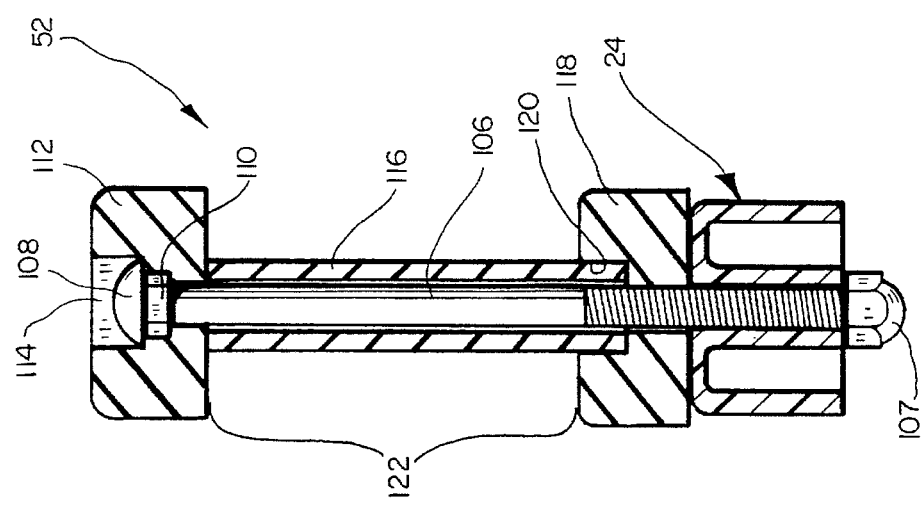
FIG. 8 is a partial sectional side elevation view, taken along the line 8—8 of FIG. 5, of a limb rest assembly of the present invention.

FIG. 8 discloses the details of the limb rest assembly 52. Each limb rest assembly 52 must be solidly mounted within the frame half 24, since the majority of the weight of the archery bow on the rack is held at the limb rest assemblies.

A carriage bolt 106 provides the main structural portion of the limb rest assembly 52. The carriage bolt is threadedly inserted through a tapped mounting location 70 (FIG. 3) formed in the frame half 24. The carriage bolt 106 terminates at a head 108 which includes a shoulder for holding the carriage bolt in position. A hex-shaped end 110 is provided adjacent to head 108 on carriage bolt 106. A first rubber bumper 112 is first inserted over the carriage bolt. A recessed portion 114 of the first bumper provides a recessed location in which the head 108 of the carriage bolt 106 in relation to the bumper 112 is positioned. The hex portion 110 seats inside a similarly shaped hexagonal recess in the first bumper 112 to prevent rotation of the carriage bolt 106 while the archery bow support rack is being used. A tubular sleeve 116 is then inserted over the middle portion of the carriage bolt 106. Thereafter, a second bumper 118 is inserted over the threaded end of the carriage bolt. The second bumper includes a recess 120 that allows the second bumper to be inserted over the tubular sleeve 116. The entire assembly is thereafter threaded into the frame 24 at a mounting location (70 or 72 FIG. 3), thereby securing the entire limb rest assembly 52 into the desired position. A crown nut 107 is then threadedly secured over an end of the carriage bolt that extends beyond the frame. The crown nut prevents loosening of the carriage bolt relative to the frame.

The first bumper 112, the tubular sleeve 116 and the second bumper 118 are all made of sponge rubber or another resilient material to engage without damage the archery bow limbs. The first bumper 112, the tubular sleeve 116, and the second bumper 118 form an annular channel 122 into which the limb of an archery bow is inserted. The depth and length of the channel 122 may vary depending upon the particular archery bow intended to be carried on the archery bow storage rack.

Figure 9:
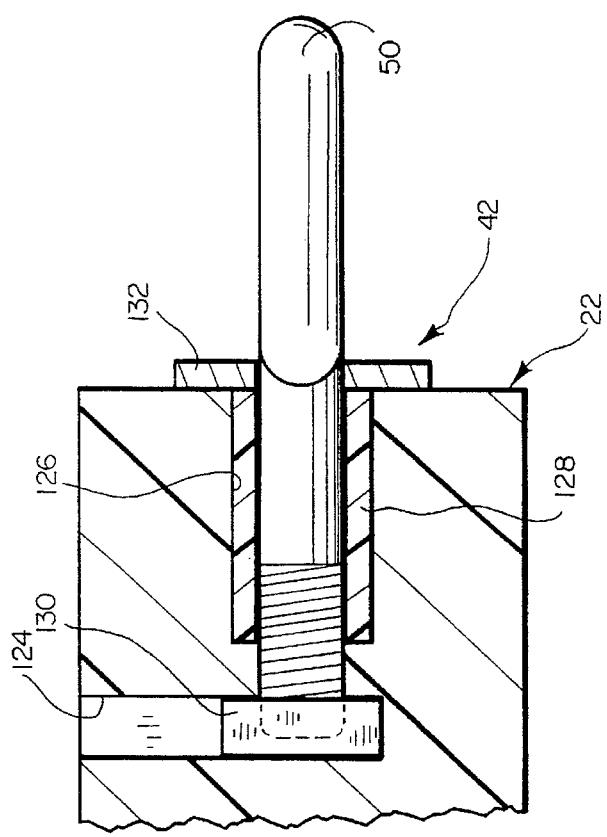
FIG. 9 is a sectional side elevation view, taken along the line 9—9 of FIG. 2, of a head eye bolt assembly of the present invention.

FIG. 9 shows the details of the eye bolt assembly 50 mounted to the frame portion 22 at an apex location 42. The apex location of the frame 22 includes a first slot 124 and a second, annular slot 126. A sleeve member 128 is inserted through the second slot 126 to provide a close fitting passageway for the eye bolt 50. After the sleeve portion 128 has been inserted into the second slot 126, a flat washer 132 is inserted over the threaded end of the eye bolt 50 before installation. The eye bolt 50 is installed onto the apex end 42 by inserting a square nut 130 through the slot 124. The nut 130 bottoms out at the precise position to enable the threaded end of the eye bolt 50 to be threadedly inserted therein. The threaded male end of the eye bolt 50 is then threadedly received by the square nut 130. The eye bolt 50 is thereafter tightened until it engages washer 132 and firmly secures the eye bolt 50 in the desired position. The structural characteristics of the apex portion 42 of the frame as well as the mounting structures used to fasten the eye bolt 50 to the frame half 22 provide sufficient structural support to withstand stresses placed on the eye bolt 50 by the hood anchor assembly 28.

Figure 10:
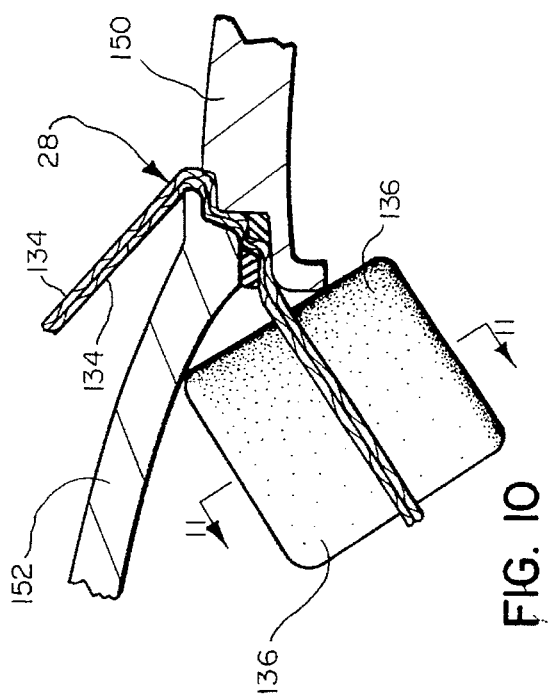
FIG. 10 is a sectional side elevation view of a hood anchor assembly held in place by a hood of vehicle according to the present invention.

FIGS. 10–11 show the details of the hood anchor assembly 28. A tether is inserted through a portion of a spring clip and folded back onto itself to form a pair of straps 134. The straps 134 are secured together by means of a machine screw and a pair of rubber bumpers 136. With reference to FIG. 11, the rubber bumpers 136 each include a recessed area 137 and a central aperture 138. The straps 134 each have an aperture corresponding to the bolt diameter. A machine screw 140 is inserted through the central apertures 138 of the bumpers 136 and the apertures in the straps, and is secured at an opposite side by means of a nut 142. The entire hood anchor assembly is then tightened together. Because of the recess areas 137, neither the head of the machine screw 140 nor the nut 142 extends outwardly beyond the rubber bumpers 136. Each hood anchor assembly 28 is attached to the eye bolt 50 by means of a conventional spring clip having a hook portion 51 and a spring clip portion 53 (FIG. 5).

As shown in FIG. 10, the strap portions 134 are laid to against a stationary surface 150 of a hood/engine compartment of an automobile. A moveable hood portion 152 is closed to secure the tether straps 134 between the stationary portion 150 and the moveable hood portion. When tension is applied to the tether strap portions 134, the rubber bumpers 136 engage the stationary portion 150 and the hinged portion 152, respectively. This mounting arrangement provides a positive mounting arrangement for the hood anchor assembly 28. The precise hood/engine compartment structure shown in FIG. 10 is merely representative, and virtually any type of hood/engine compartment closure may be used in connection with the present invention.

The frame half 22 of FIG. 3 also discloses a pair of tensioning adjustment strap mounting locations 75 to which the tensioning adjustment strap assemblies 26 are mounted. The strap assemblies 26 are designed to include enough strap material to accommodate the widest hood arrangement normally expected in any given vehicle. The custom fit of the archery bow support assembly 20 is easily adjusted by simply increasing or decreasing the length of the adjustment straps.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications with the proper scope of the appended claims appropriately interpreted in accordance with the doctrine of equivalents.

We claim:

1. An archery bow storage rack for vehicles, comprising:
    a first frame assembly including a first frame member movable to an exterior portion of a vehicle;
    a first pair of limb rests mounted to the first frame member to engage the limbs of an archery bow held by the storage rack;
    a first bow string support mounted to the first frame member to engage a string of an archery bow held by the storage rack;
    a first vehicle contact member;
    a first damping device independent and separable from the first vehicle contact member interposed between the first frame member and the first vehicle contact member to dampen vibrations imparted to the combined first frame member and archery bow held by the storage rack during transit.

2. An archery bow storage rack for vehicles according to claim 1 wherein an archery bow is held in part on the storage rack by at least a partial draw weight of the archery bow.

3. An archery bow storage rack for vehicles according to claim 1 wherein the archery bow storage rack secures an archery bow in a horizontal position.

4. An archery bow storage rack for vehicles according to claim 1 wherein the exterior portion of the vehicle comprises a vehicle hood, the first frame assembly being secured to the vehicle hood by a pair of hood anchor assemblies attached to opposite sides of the first frame member, a tensioning adjustment strap connected between the frame member and one of the hood anchor assemblies to adjust the retentive tension imparted on the frame member.

5. An archery bow storage rack for vehicles according to claim 1, further comprising a plurality of leg assemblies attached to the first frame member to suspend the first frame member above the exterior portion of the vehicle, each leg assembly including a suction cup to directly contact the exterior portion of the vehicle, the plurality of suction cups preventing relative displacement between the frame assembly and the exterior portion of the vehicle.

6. An archery bow storage rack for vehicles according to claim 1 wherein no structural alteration or modification of any part of the vehicle is required to secure the frame assembly to the exterior portion of the vehicle.

7. An archery bow storage rack for vehicles according to claim 1 wherein the archery bow storage rack is mounted to a substantially horizontal exterior surface of a vehicle transporting the storage rack.

8. An archery bow storage rack for vehicles according to claim 1 wherein the archery bow storage rack is mounted to a hood portion of a vehicle transporting the storage rack.

9. An archery bow storage rack for vehicles, comprising:
a first frame assembly including a first frame member mountable to an exterior portion of a vehicle;
a first pair of limb rests mounted to the first frame member to engage the limbs of an archery bow held by the storage rack;
a first bow string support mounted to the first frame member to engage a string of an archery bow held by the storage rack;
a first damping device interposed between the first frame member and the exterior portion of the vehicle to dampen vibrations imparted to the combined first frame member and archery bow held by the storage rack during transit;
a plurality of leg assemblies attached to the first frame member to suspend the first frame member above the exterior portion of the vehicle, each leg assembly including a suction cup to directly contact the exterior portion of the vehicle and an upstanding structure connecting the suction cup to the frame member;
wherein the first damping device comprises a plurality of coil springs, each coil spring being disposed between the respective suction cup and the first frame member to absorb shock and dampen vibrations during transit.

10. An archery bow storage rack for vehicles, comprising:
a first frame assembly including a first frame member mountable to an exterior portion of a vehicle;
a first pair of limb rests mounted to the first frame member to engage the limbs of an archery bow held by the storage rack;
a first bow string support mounted to the first frame member to engage a string of an archery bow held by the storage rack;
a first damping device interposed between the first frame member and the exterior portion of the vehicle to dampen vibrations imparted to the combined first frame member and archery bow held by the storage rack during transit;
a second frame assembly including a second frame member mountable to an exterior portion of a vehicle;
a second pair of limb rests mounted to the first frame member to engage the limbs of an archery bow held by the storage rack;
a second bow string support mounted to the first frame member to engage a string of an archery bow held by the storage rack;
a second damping device interposed between the first frame member and the exterior portion of the vehicle to dampen vibrations imparted to the combined first frame member and archery bow held by the storage rack during transit.

11. An archery bow storage rack for vehicles, comprising:
a frame assembly including a frame member mountable to a portion of a vehicle;
a pair of limb rests, coupled to the frame member, each limb rest comprising upper and lower resilient retention members having respective portions engagable by a limb of an archery bow to hold the limb in a horizontal position on the storage rack with a side of the limb being openly exposed without restraint for rapid removal from the archery bow storage rack;
at least one bow string support coupled to the frame member to engage a bow string of an archery bow held by the storage rack;
wherein the frame member in combination with the limb rests and bow string support are configured to suspend an archery bow in a substantial horizontal position on the vehicle.

12. An archery bow storage rack for vehicles according to claim 11, further comprising a damping device coupled to the frame assembly to dampen vibrations and absorb shock imparted to the frame member during transit of the vehicle.

13. An archery bow storage rack for vehicles according to claim 11 wherein the platform comprises a plurality of suction cups, the plurality of suction cups preventing relative displacement between the frame assembly and the portion of the vehicle.

14. An archery bow storage rack for vehicles according to claim 11 wherein no structural alteration or modification of any part of the vehicle is required to secure the archery bow storage rack assembly to the portion of the vehicle.

15. An archery bow storage rack for vehicles, comprising:
a frame assembly including a frame member mountable to a portion of a vehicle;
a pair of limb rests coupled to the frame member to engage the limbs of an archery bow held by the storage rack;
at least one bow string support coupled to the frame member to engage a bow string of an archery bow held by the storage rack;
wherein the frame member in combination with the limb rests and bow string support are configured to suspend an archery bow in a substantially horizontal position on the vehicle;
a coil spring disposed between the portion of the vehicle and the frame member to biasingly suspend an archery bow held on the frame member during transit.

16. An archery bow storage rack for vehicles, comprising:
a frame assembly including a frame member mountable to a portion of a vehicle;
a pair of limb rests coupled to the frame member to engage the limbs of an archery bow held by the storage rack;
at least one bow strong coupled to the frame member to engage a bow string of an archery bow held by the storage rack;
wherein the frame member in combination with the limb rests and bow string support are configured to suspend an archery bow in a substantially horizontal position on the vehicle;
a plurality of leg rest assemblies, each leg rest assembly comprising a platform, an upstanding structure interconnecting the platform and the frame member, and a coil spring disposed between the platform and frame member to biasingly suspend an archery bow held on the frame member.

17. A removable archery bow storage rack for vehicles, comprising:
   a first frame half for mounting to a surface of a vehicle to suspend a first archery bow;
   a second frame half for mounting to a surface of a vehicle to suspend a second archery bow;
   at least one tensioning adjustment strap to secure the first frame half to the second frame half;
   opposed hood anchor assemblies, each hood anchor assembly being attached at one end to the respective first and second frame halves, each hood anchor assembly being held in place by a closed vehicle hood.

18. An archery bow storage rack for vehicles according to claim 17 wherein no structural alteration or modification of any part of the vehicle is required to secure the archery bow storage rack assembly to the vehicle.

19. An archery bow storage rack for vehicles according to claim 17, further comprising a plurality of leg rest assemblies coupled to the first and second frame halves, each leg rest assembly comprising a platform, an upstanding structure interconnecting the platform and the frame member, and a coil spring disposed between the platform and frame member to biasingly suspend the first and second archery bows held on the respective first and second frame halves.

20. An archery bow storage rack for vehicles according to claim 17, further comprising a damping device coupled to each of the first and second frame halves to dampen vibrations and absorb shock imparted to the first and second frame halves during transit of the vehicle.

21. A removable archery bow storage rack for vehicles comprising:
   a generally triangularly shaped main frame assembly having a top, apex end and a base side, the base side including opposed base ends;
   a string mounting location provided at the apex end of the main frame assembly;
   a pair of limb rests provided at the opposed base ends to engage limb portions of an archery bow;
   the string mounting location and the limb rests providing a triangularly shaped mounting configuration for the archery bow limbs and the strings for suspending the archery bow on the storage rack.

22. An archery bow storage rack for vehicles according to claim 21, further comprising a central space provided in the triangularly shaped main frame for accommodating archery bow accessories.

23. An archery bow storage rack for vehicles according to claim 21 wherein the string mounting locations comprise a pair of string rest assemblies for holding a bow string of an archery bow.

24. A method of storing archery bows during operation of a vehicle, comprising the steps of:
   providing a frame assembly comprising:
      a frame member;
      a pair of limb rests mounted to the frame member to engage the limbs of an archery bow held by the storage rack;
      a first bow string support mounted to the frame member to engage the bow string of an archery bow held by the storage rack;
      multiple shock absorbing leg assemblies, each leg assembly including a platform, an upstanding structural member interconnecting the platform and the frame member, and a coil spring to biasingly support the weight of the frame member and an archery bow held by the frame member;
   mounting the frame assembly in a horizontal position on a surface of a vehicle;
   placing an archery bow on the frame assembly such that the limbs of the archery bow engage the limb rests;
   at least partially drawing the bow string of the archery bow;
   inserting the bow string while at least partially drawn over the first bow string support;
   releasing the bow string so that the first bow string support holds the particular draw weight of the archery bow to hold the archery bow in position on the storage rack;
   supporting the archery bow in a biased, horizontally oriented position while driving the vehicle.

25. The method of claim 24 wherein each platform of the respective leg assemblies comprises a suction cup, and further comprising the step of creating a vacuum under each suction cup when mounting the storage rack to the vehicle.

26. The method of claim 24, further comprising the step of providing a second bow string support to provide an alternative resting position for the archery bow string.

27. The method of claim 24 wherein mounting the frame to the vehicle comprises the steps of:
   providing a pair of hood anchor assemblies;
   placing the hood anchor assemblies inside the engine compartment of a vehicle with the hood open;
   closing the hood with the hood anchor assemblies at least partially maintained inside the engine compartment;
   connecting each of the hood anchor assemblies to the respective frame members;
   providing a tensioning adjustment strap to interconnect the two frame members;
   shortening the tensioning adjustment strap to firmly hold the frame halves on the hood of the vehicle.

28. The method of claim 24 wherein the step of mounting the frame to the vehicle requires no structural modification of any part of the vehicle.

29. A method of storing archery bows during operation of a vehicle comprising the steps of:
   providing a frame assembly comprising;
   a frame member;
   a pair of limbs rests each having at least one resilient member having an aperture therein and a rigid member disposed within the resilient member aperture, the rigid member being connected to the frame member to engage the limbs of an archery bow held by the storage rack;
   a first bow string support mounted to the frame member to engage the bow string of an archery bow held by the storage rack;
   mounting the frame assembly on a surface of a vehicle;
   at least one vehicle contact member;
   at least one coil spring interposed between the frame assembly and the vehicle contact member to dampen vibrations and absorb shock imparted to the frame assembly during transit;
   mounting the frame assembly on a surface of a vehicle;
   securing an archery bow to the frame assembly such that the limbs of the archery bow engage the limb rests and the string of the archery bow contacts the first bow string support;
   supporting the archery bow directly above the vehicle upon which the frame assembly is mounted while operating the vehicle, wherein the damping device comprises a coil spring.

* * * * *